United States Patent [19]

Brunel et al.

[11] Patent Number: 5,050,558
[45] Date of Patent: * Sep. 24, 1991

[54] FUEL INJECTION PUMP FOR INTERNAL-COMBUSTION ENGINES

[76] Inventors: AndréLa Coliniére, 2 route de Vourles, F-69230 Brunel, St. Genis-Laval; Gérard Duplat, 6 rue de la Vaviodiére,, F-69670 Vaugneray; Jean Leblanc, 25 rue Claude Farrére,, F-69003 Lyon, all of France

[ * ] Notice: The portion of the term of this patent subsequent to Aug. 24, 2007 has been disclaimed.

[21] Appl. No.: 135,433
[22] PCT Filed: Apr. 4, 1987
[86] PCT No.: PCT/DE87/00148
§ 371 Date: Nov. 16, 1987
§ 102(e) Date: Nov. 16, 1987
[87] PCT Pub. No.: WO87/06307
PCT Pub. Date: Oct. 22, 1987

[30] Foreign Application Priority Data

Apr. 17, 1986 [DE] Fed. Rep. of Germany ....... 3612942

[51] Int. Cl.[5] ............................................. F02M 39/00
[52] U.S. Cl. ..................................... 123/453; 123/502; 123/506; 417/462
[58] Field of Search ............... 123/450, 506, 458, 501, 123/502; 417/462

[56] References Cited

U.S. PATENT DOCUMENTS

| 3,177,860 | 4/1965 | Glikin | 123/502 |
|---|---|---|---|
| 3,314,406 | 4/1967 | Femp | 123/502 |
| 4,201,170 | 5/1980 | Overfield | 123/506 |
| 4,334,831 | 6/1982 | Baxter | 417/462 |
| 4,453,522 | 6/1984 | Salzgeber | 123/502 |
| 4,453896 | 6/1984 | Vilardo | 417/462 |
| 4,523,569 | 6/1985 | Seilly | 123/506 |
| 4,529,961 | 5/1982 | Johnston | 123/502 |
| 4,604,980 | 8/1986 | Leblanc | 123/450 |
| 4,662,337 | 5/1987 | Eheim | 123/450 |
| 4,711,618 | 12/1987 | Adinett | 123/450 |

FOREIGN PATENT DOCUMENTS

| 0070558 | 7/1982 | European Pat. Off. | 123/450 |
|---|---|---|---|
| 1919707 | 11/1920 | Fed. Rep. of Germany | 123/450 |
| 2235276 | 1/1975 | France | 123/450 |
| 2257022 | 8/1975 | France | 123/450 |

Primary Examiner—Carl S. Miller

[57] ABSTRACT

In the proposed fuel injection pump of the radial-piston pump type, the fuel injection rate can be controlled exactly by means of an electrically controlled valve which monitors a relief channel (66) of the pump working space (53) and which, by means of its closing time, determines the period of high-pressure injection during the pump-piston feed strokes. In order utilize the total length of the flanks of the drive cams as efficiently as possible, additionally injection adjustment is carried out as a result of the rotation of an essentially stationary part (13, 33) of the cam drive of the pump pistons (37) of the fuel injection pump relative to the rotary-driven part (8,9) of this cam drive. At the same time, on a fuel injection pump with a rotary-driven cam ring (9), there is a separation between a roller-carrying part (13) and a part (33) carrying pistons (37). However, these parts are then coupled to one another via a coupling arm (39), and the piston-carrier part (33) carrying the pistons (37) is thus free of transverse forces subjecting its mounting to stress.

44 Claims, 6 Drawing Sheets

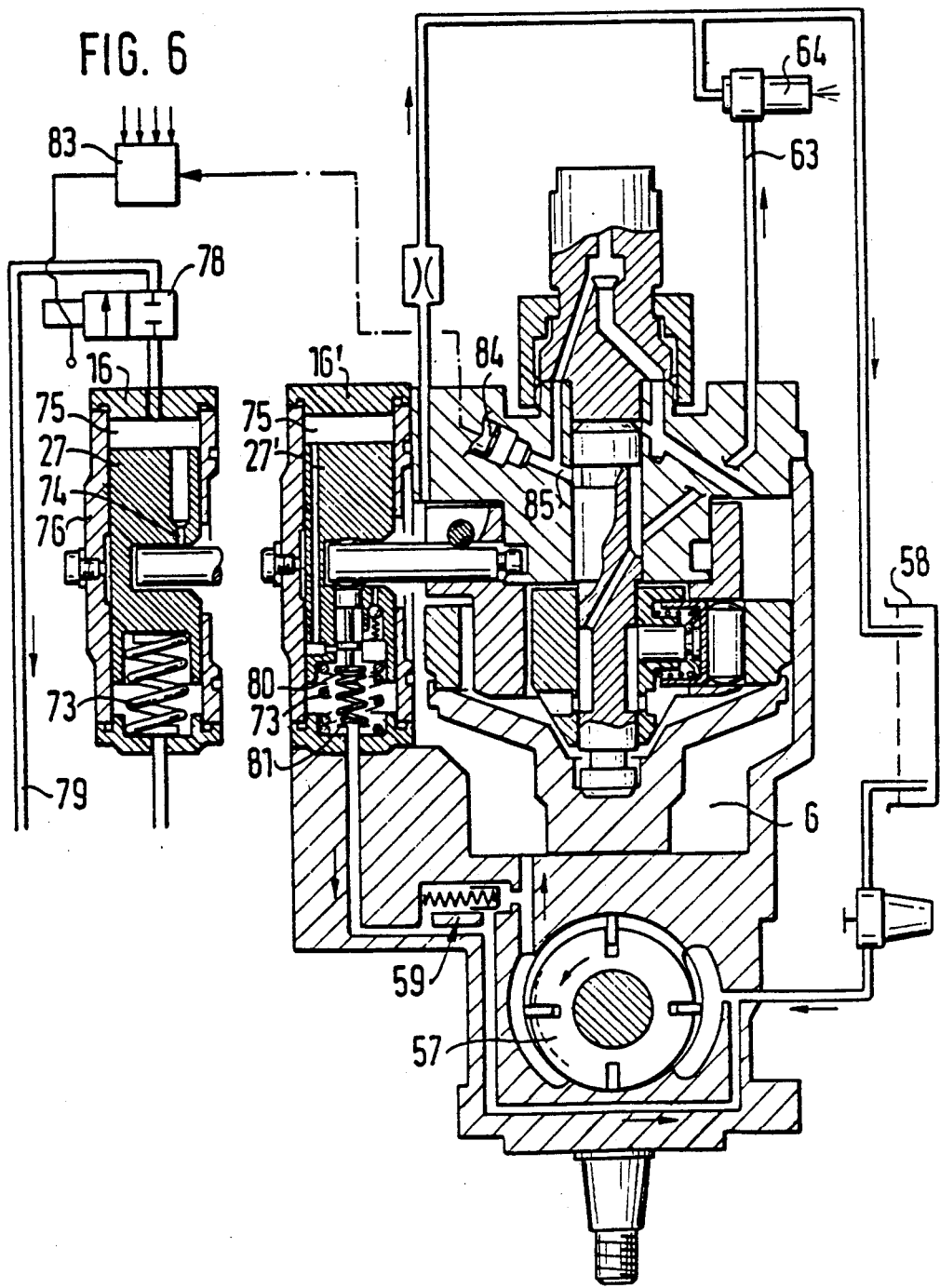

FUEL INJECTION PUMP FOR INTERNAL-COMBUSTION ENGINES

BACKGROUND OF THE INVENTION

The invention starts from a fuel injection pump. In a known fuel injection pump disclosed by GB-A-2,086,080, the lower end of the distributor is designed as a piston carrier and the rollers are mounted in guides of a roller-carrier part by means of their roller tappets. A cam drive of the pump pistons consists of a cam ring which is mounted fixed in place in the pump casing, that is to say the stationary part of the cam drive. It is the roller-carrier part which is driven to rotate, this being connected via a toothing of the drive shaft of the fuel injection pump. This drive shaft is coupled, on its end face, to the end face of the distributor on the same side as the piston-carrier part. The injection-effective feed stroke of the pump pistons is controlled by means of a solenoid valve, a relief channel of the pump working space being closed by means of an electromagnetic valve for the start of injection (injection start), and this valve being opened again in order to determine the end of injection. Where a stationary cam is concerned, the disadvantage of this type of control is that the length of the cam flank driving the pump pistons must serve both for calculating the injection time and for calculating the injection start. This means that, when the injection start is late and the fuel injection quantity is large, the limits of the operating capacity of such a fuel injection pump are reached just when this fuel injection pump has to feed a large number of cylinders of an internal-combustion engine per revolution, high injection pressures have to be generated and high rotational speeds are to be brought about, as is required in modern direct-injection diesel engines. Since there are limits to the steepness of the cams, the length of the cam flank cannot be increased to any extent desired. Also the assembly of such pumps involves a high outlay. The roller tappets are guided in slots which open towards the upper part of the pump casing, so that the roller-carrier part must be exactly in line with the pump casing to ensure that the roller tappets run perfectly. Moreover, the roller-carrier part is also not guided radially, so that it is exposed not only to torsional vibrations, but also to certain tilting vibrations from the drive side of the drive shaft. Moreover, the coupling of the distributor to the drive shaft is rigid and does not allow any error in the alignment of the axes.

Particularly on radial piston pumps of the type in which the part of the cam drive carrying the cam contact surface is driven to rotate, while the piston carrier is stationary, according to German Offenlegungsschrift 301,039, it is difficult to adjust the injection start. In the fuel injection pump known from this publication, the injection start is adjusted by varying the relative position of the distributor in relation to the rotary-driven part of the cam drive which sets this distributor in rotary movement. But the disadvantage of this is that, when such a fuel injection pump is used for the purpose already described above, in practice a large part of the cam flank has to be reserved for adjusting the injection start, thus restricting the capacity of a fuel injection pump when the internal-combustion engine has a large number of cylinders to be fed.

SUMMARY OF THE INVENTION

The fuel injection pump in accordance with the invention, has pump pistons and rollers driving the pump pistons which are guided in constructional parts, which are separated from one another and which are coupled to one another so as to allow misalignments in the radial and axial directions. The advantage of this is that the forces generated by the cam drive as a result of the running of the rollers over the cam contact surface are not transmitted, for example, to the piston-carrier part in such a way that the latter is loaded to such an extent that its guide becomes jammed. On the contrary, a special coupling allows the coupled part to follow with only low reaction, thus increasing the operating capacity of the fuel injection pump, especially in a fuel injection pump where high impact loads are generated. In fuel injection pumps of the radial-piston type, this arises when high injection pressures have to be generated, as is necessary, for example, when direct-injection internal-combustion engines are used. High impact loads of high frequency also arise when a distributor injection pump of the radial-piston type is provided for feeding a large number of internal-combustion engine cylinders, as, for example, in an 8-cylinder internal-combustion engine. Furthermore, by means of this design, it is possible to control the injection start as a result of the relative adjustment of the essentially stationary part of the cam drive in relation to the essentially rotating part of the cam drive. In a fuel injection pump of the type known from German Offenlegungsschrift 3,010,839, it becomes possible, at the same time, for the piston carrier to be made rotatable, without the danger that the now rotatable part will be jammed on the distributor.

In an advantageous that the coupling part be designed as a radial coupling arm provided between the roller-carrier part and the piston-carrier part and which, when coupled with the other part, can compensate alignment errors in all directions as a result of the spherical shape.

Advantageously, the distributor can be connected to the rotary-driven part in such a way that production inaccuracies, that is to say alignment errors, can be compensated to a very large extent. Another essential advantage is that a very simple assembly of the fuel injection pump is guaranteed because the distributor can be pushed in subsequently via the distributor cylinder, independently of other subassemblies, and can be coupled to the rotating part.

Advantageously, the rotary-driven part is guided on the outer periphery in the casing of the fuel injection pump, the advantage of this being that the tilting moments acting on the drive shaft can be compensated more favourably in drive terms and the rotating part is guided exactly. An advantage is that the roller-carrier part can support the forces, transmitted to it by the pump drive, on the pump casing over a large area.

As regards the mounting of the roller-carrier part, an advantageous solution is provided for axial retention. Furthermore, this allows a highly rigid connection between the roller-carrier part and the servo-motor to be made.

Advantageously, the pump is controlled by means of an electrically controlled valve which can be arranged in a space-saving way on the injection pump between the pressure connections to the pressure channels. Furthermore, an advantage of the valve used is that the injection phase can be controlled simply by controlling the valve or its closing time, specifically both after the injection start and also the injection time. For this, a pressure transducer can advantageously be used for controlling the injection start. Both the filling of the pump working space and the relieving of the pump working space can advantageously be carried out by means of this valve, but with the pump working space being filled rapidly and without pressure loss, especially for injection pumps intended for high-speed internal-combustion engines. The assembly becomes substantially simpler because, for example, the roller-carrier part are and the piston-carrier part preassembled, together with the pistons and rollers, on the hydraulic block closing the pot-shaped casing and can be introduced into the cam ring quickly and easily, simply by holding the rollers together. At the same time, the pump casing, while of small overall height, need only be made in two parts.

Particularly in conjunction with the control of the injection rate by means of an electrically controlled solenoid valve, an especially advantageous design, by means of which the solenoid valve can advantageously be cooled, is obtained. This is advantageous especially in solenoid valves subjected to high current intensities, because they have to close a relief channel, for example against a transfer pressure in the pump working space, in order to control the start of the injection-effective fuel feed. An advantage is that the magnet is flushed as a function of the rotational speed and consequently at the same time as a function of the number of actuations of the solonoid valve or its heat load. The advantage of this design is also that flushing does not disrupt the operation of the electromagnetic valve, because it takes place only in the interludes in the actuation of the solonoid valve.

The fuel injection pump is controlled in an advantageous way in which the load on the solenoid valve is less inasmuch as it does not first have to be closed against the transfer pressure in order to control the injection-effective feed stroke. This solution is also advantageous especially on fuel injection pumps which are intended for internal-combustion engines operated at high speed. Here, only the switching time when the solenoid valve opens has an effect on the control of the injection rate, so that the speed error in the control of the injection rate is only very slight here. There is therefore no need, for any outlay to compensate errors in this respect. Advantageously, the flank of the drive cam is utilized as efficiently as possible for feed purposes, so that even a large number of internal-combustion engine cylinders can be fed by means of such an injection pump. At the same time, injection start is adjusted by varying the relative position of the stationary part of the cam drive in relation to the rotary-driven part, and various drive-regulating members can advantageously be used. Thus, the adjustment can be made as a function of the various parameters which also take into account, for example, the hot-running of the internal-combustion engine. A regulating piston subjected to the speed-dependent pressure within the fuel injection pump can be used advantageously and inexpensively, or a more accurate control can be obtained by setting an exact control pressure as a function of various parameters or only one parameter by means of a timing valve or a proportional valve. The adjustment of the injection start can also be regulated by means of a feed back member.

If, on the other hand, even stricter requirements are demanded as regards the injection timing control and the rate control, then a procedure is employed in which there are many possibilities for taking action and, in addition, control speed can be kept very high to prevent sawing in transition states, since the injection timing control is already pilot-controlled by other means.

Brief Description of the Drawings

Six exemplary embodiments of the invention are illustrated in the drawing and, together with their advantages, explained in detail in the following description.

FIG. 5 shows the first embodiment of a servo-motor (injection adjuster) for actuating the roller-carrier part, FIG. 6 shows a second embodiment of the servo-motor.

DESCRIPTION OF THE PREFERRED EMBODIEMENTS

Figure 1:
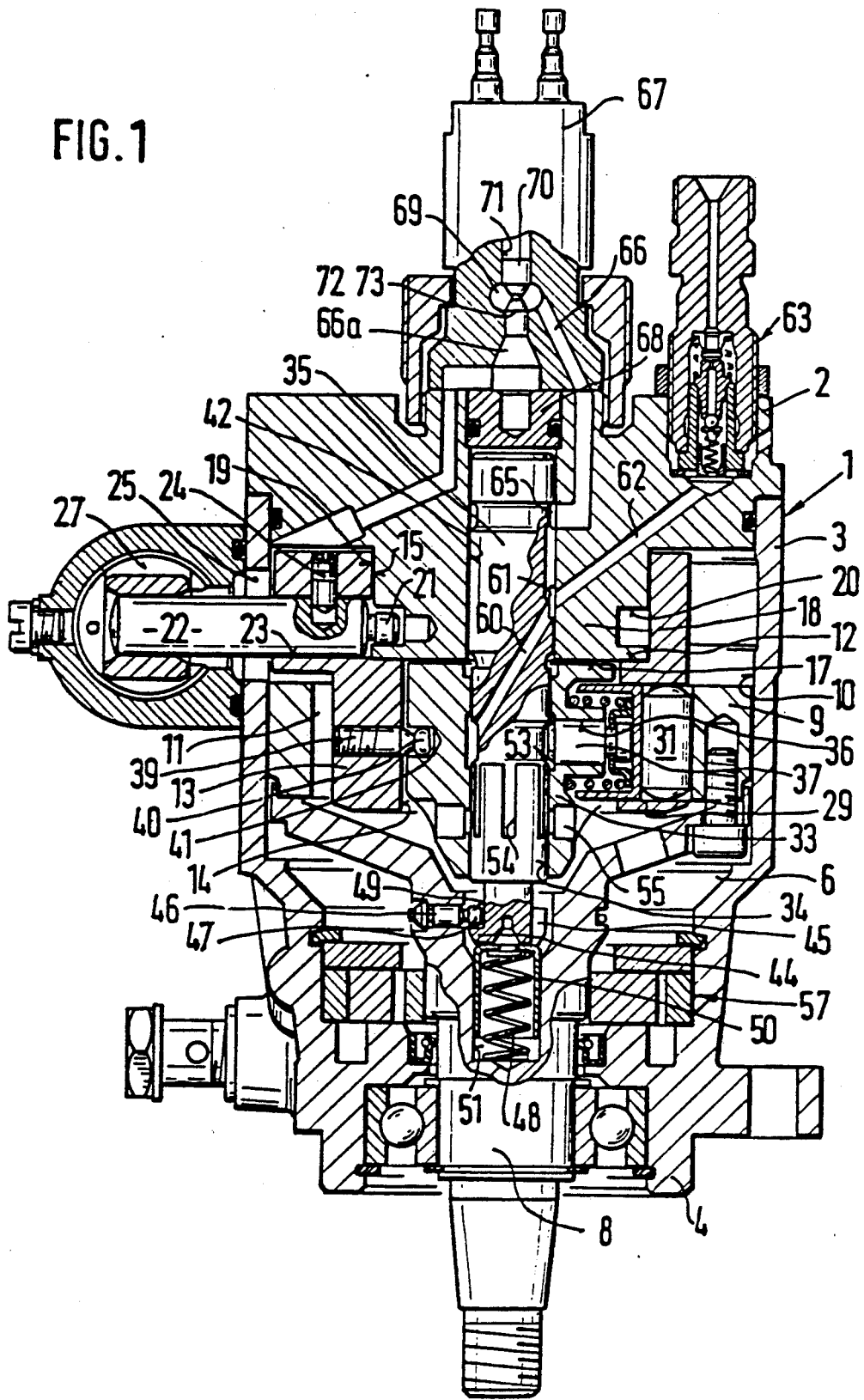
FIG. 1 shows a longitudinal section through a first exemplary embodiment of the fuel injection pump according to the invention.

In the representation of the first exemplary embodiment according to FIG. 1, the drawing shows a longitudinal section through a distributor-type fuel injection pump of the radial-piston type. The casing of the injection pump consists of a pot-shaped casing 1 and of a cover part 2 which closes the latter and which can also be called a hydraulic head. The pot-shaped casing part has a cylindrical part 3 and a bottom part 4, the cover part being pushed in from the open end of the cylindrical part to ensure the sealed enclosure of a pump inner space 6. Guided concentrically to the bottom part 4 is a drive shaft 8 which widens in the manner of a pot in the inner space 6 of the fuel injection pump and which is connected there, at the edges, to a cam ring 9 guided by means of its outside diameter on the cylindrical wall 10 of the cylindrical part 3. The cam ring, on its inner face, has a cam contact surface 11 with cams directed radially inwards and matching in number and sequence the number and sequence of pump pistons provided in the fuel injection pump and the number of pump-piston feed strokes to be executed per revolution by these pump pistons. The cam ring 9, together with the drive shaft 8, constitutes a rotary-driven part of a cam drive, by means of which pump pistons are moved.

Adjacent to the cam contact surface 11 and following it in a radially inward direction is a roller-carrier part 13 which is an annular element, the annular shape being formed by an inner step bore composed of a first step-bore part 14 of smaller diameter and a second step-bore part 15 of larger diameter. That portion of the roller-carrier part which has the first step-bore part 14 overlaps the cam ring 9. Between the first step-bore part 14 and the step-bore part 15 is formed a shoulder 12 which comes to rest against the inner end face 17 of the cover part 2. This end face limits a cylindrical guide part 18 of the cover part 2, which projects inwards from the cover part 2 into the pump inner space coaxially relative to the axis of the drive shaft 8. Its outer surface 19 serves as a guide for the roller-carrier part 13, into the second step-bore part 15 of which the cylindrical guide part 18 penetrates. For axial retention, in the outer surface 19 there is an annular groove 20, into which projects a pin 21 located at the end of an actuating arm 22 inserted into the roller-carrier part 13 through a radial passage bore 23. The roller-carrier part 13 is of greater thickness at this point and has a retaining element, for example in the form of a stud bolt 24, by means of which the actuating arm is secured axially and radially in the passage bore. The other end of the actuating arm projects outwards through a perforation 25 in the cylindrical part 3 of the pot-shaped casing part. A hydraulic servo-motor is connected to the casing of the fuel injection pump at this point and has a regulating piston 27, to which the actuating arm 22 is coupled.

In the region of the first step-bore part 14, the roller carrier part 13 has radial bores 29, in which are guided cup-shaped roller tappets 30 having radially on the outside, in a known way, a receptacle for a roller 31 which runs on the cam contact surface 11. On the other side, there is, on the inner face of the cup-shaped roller tappet, a compression spring 32 which is supported on an inner piston-carrier part 33 adjacent to the roller-carrier part 13 in the radial direction. The piston-carrier part is designed as an annular element and by means of its inner bore is guided on a distributor 35. In the piston-carrier part 33 there are likewise radial bores 36, in which pump pistons 37 are guided. These are provided on the piston-carrier part 33 in the same arrangement and distribution as rollers on the roller-carrier part 13. The end of each of the pistons is coupled to a respective roller tappet 30 by means of a spring plate 38.

Between the piston-carrier part 33 and the roller-carrier part 13 there is a connection which, in the exemplary embodiment, is designed as a coupling arm 39 in the form of a stud which is pressed radially into the roller-carrier part 13 in the region of the first step-bore part 14 and which projects, by means of a spherical head 40, into a recess 41 matched to the head and located on the periphery of the piston-carrier part.

Finally, the distributor 35 is guided in a distributor cylinder 42 which is arranged in the cover part 2 coaxially relative to the axis of the drive shaft 8. The piston-carrier part 33 is mounted on the end of the distributor projecting from this distributor cylinder 42, and at the other side of this, at the outermost end, the distributor is coupled to the drive shaft 8. For this purpose, the distributor has, at the end, a collar 44 which can be formed, for example, by a ring fastened to the end of the distributor, as shown in FIG. 1. This collar 44, on its outer surface, has a continuous longitudinal groove 45 and, next to this, a non-continuous longitudinal groove 49 which opens towards the cover part 2. A stud 46 projecting radially from the drive shaft engages into this non-continuous longitudinal groove by means of a spherical head 47, the engagement being secured by clamping a compression spring 48 between the end of the distributor and the drive shaft 8. The distributor 35 is coupled to the drive shaft 8 by first rotating the distributor, so that the head 47 can be guided through the continuous longitudinal groove 45, and after the collar 44 is positioned on the side of the compression spring 48 of the head 47 the distributor is rotated so that the head 47 can engage into the noncontinuous groove 49.

This makes it possible to achieve a very simple assembly of the distributor which, for this purpose, is introduced through the distributor cylinder 42 from outside the fuel injection pump and is then coupled to the drive shaft 8 simply as a result of rotation. For this, for example as FIG. 2 also shows clearly, the outside diameter of the collar 48 is of a size which is less than or at most equal to the diameter of the distributor cylinder 42. Advantageously, between the distributor end and the compression spring 48 there can also be a guide sheath 50 which, by means of its closed end face, comes to rest against the end face of the distributor end and which, with its shell facing the open side, enters an axial bore 51 in the drive shaft 8 and there encloses the compression spring 48.

This type of coupling by means of the spherical head 47 also guarantees that alignment errors are compensated, without the guide of the distributor in the distributor cylinder 42 being subjected to stress. Advantageously, the distributor can also be removed for maintenance purposes, without the fuel injection pump having to be dismantled completely.

Figure 2:
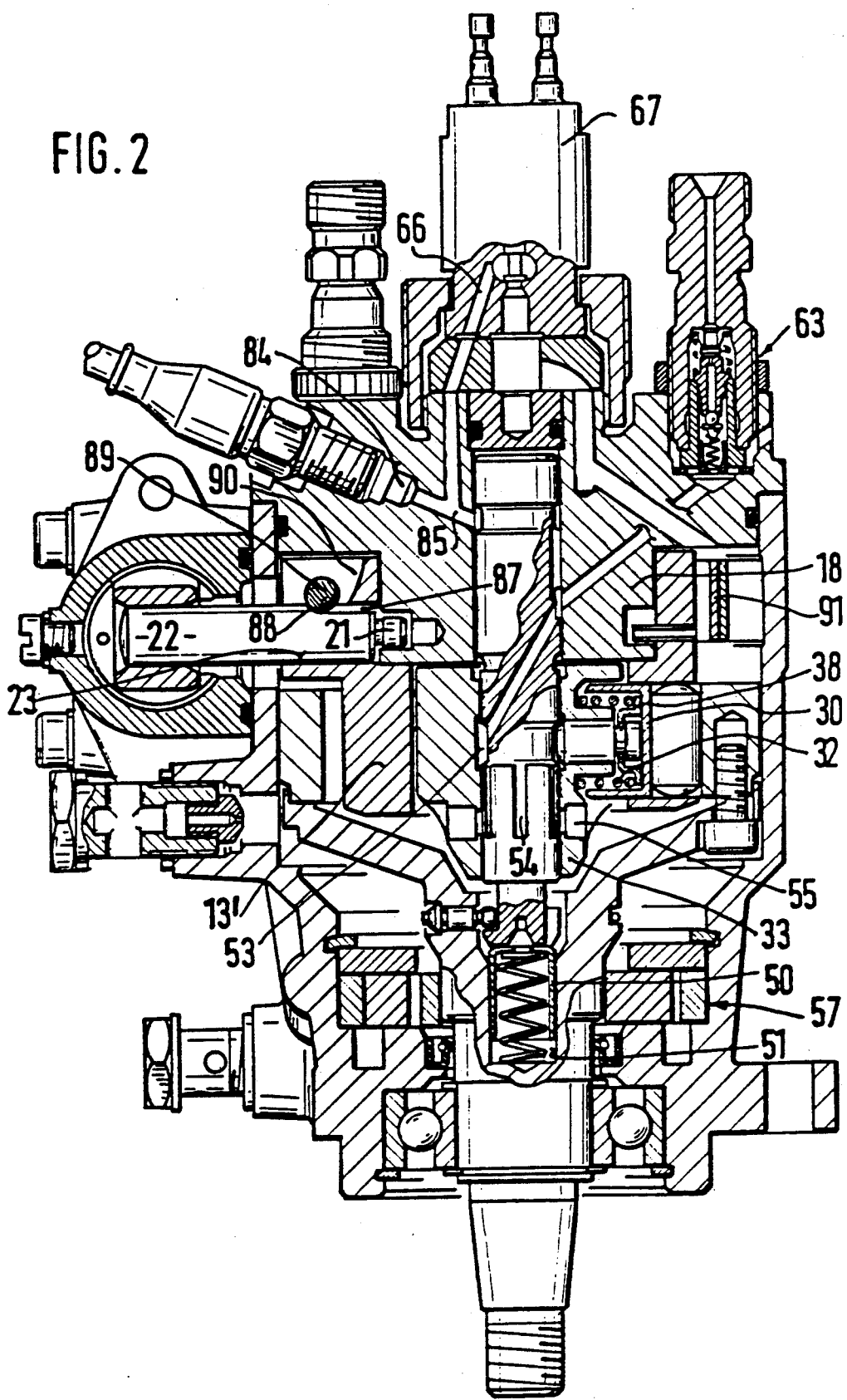
FIG. 2 shows a second exemplary embodiment by means of a longitudinal section through a distributor injection pump, with the distributor and roller-carrier part being coupled to the injection adjuster in a different way from that of the exemplary embodiment according to FIG. 1.

The distributor has an annular groove 53 on its outer surface, which can be seen more clearly in FIG. 2. This is located in the radial plane of the piston axes or in the mid-plane of the cam contact surface and is connected to longitudinal grooves 54 which, designed as filling grooves, are arranged distributed at intervals round the periphery of the distributor and which, during the rotation of the distributor, can be connected to filling bores 55 provided in the piston-carrier part 33. The filling bores are made preferably rectangular in the region of the filling grooves 54 and connect the annular groove 53 to the pump inner space 6 when the filling grooves coincide with the filling orifices. At the same time, the annular groove 53 forms part of the pump working space which is also formed by that portion of the radial bores 36 which is exposed by the pistons towards the annular groove 53. The pump inner space 6 is supplied with fuel in a way known per se by a fuel feed pump 57 which is arranged in a known way inside the casing of the fuel injection pump and which conveys fuel out of the fuel store 58, as shown in the hydraulic circuit diagram according to FIG. 5, into the inner space 6, the pressure forming there being speed-dependent because of the drive-synchronous speed of the fuel feed pump 57, and additionally a pressure control valve 59 also being connected parallel to the fuel feed pump. This speed-dependent pressure is required, above all, for controlling the adjustment of the injection start or the rotation of the roller-carrier part 13 via the servo-motor 16.

A channel 60 leads from the pump working space or the annular groove 53 to a distributor orifice 61 which is provided in the form of a longitudinal groove on the periphery of the distributor in the region of the distributor cylinder 42. In the radial plane of the distributor orifice, there extends from the distributor cylinder 42 pressure channels 62 which are arranged on the periphery of the distributor or of the distributor cylinder according to the number and sequence of the cylinders of the internal-combustion engine which are to be fed. The pressure channels lead, for example, via a pressure valve 63, to end-face connections of injection lines 63 (see FIG. 5) which are connected to injection nozzles 64.

The distributor orifice is also in communication with an annular space 65 formed between the outer surface of the distributor and the distributor cylinder 42. This is obtained, for example, by means of an annular groove in the outer surface of the distributor. A relief channel 66 leads from the annular space 65 to an electrically controlled valve which is fastened to the end face of the cover part 2 of the fuel injection pump and which is entirely surrounded by the pressure connections of the injection lines 63. On this side there is also a closure for the distributor cylinder 42, this closure being in the form of a plug 68 and serving at the same time as an axial limitation of the distributor.

The electrically controlled valve is of the type disclosed in German Patent Application P 35 23 536.5. However, other valves can also be used, but the above-mentioned valve is especially advantageous. It has a closing member designed as a needle valve 70 which is guided sealingly in a bore 71. At the same time, the axis of the needle valve is coaxial relative to the axis of the distributor, but at least parallel to this. On the end face, the needle-valve closing member has a conical sealing face 72 which interacts with a valve seat 73 of the same shape. The needle-valve also has an annular recess in the region of a valve space 69 connected directly to the annular space 65 via the relief channel 66. When the needle-valve closing member is lifted off, the valve space 69 opens, via the conical seat 73, into an axially diverting part 66a of the relief channel which then leads, via the cover part 2, to the suction side of the fuel injection pump or to the pump inner space 3 which, here, serves as a relief space. As a result of the design described, the valve closing member 70 is compensated in terms of pressure in the closing position, that is to say it can be opened quickly by means of only slight magnetic forces, so that the pump working space can be relieved rapidly via the channel 60, the distributor orifice 61, the annular space 65 and the relief channel 66. At the same time, the pressure exerted from the pump working space assists the opening movement of the needle-valve closing member 70 after the initial opening stroke. This ensures very rapid opening and an exact moment at which the fuel feed ends.

When the drive shaft 8 is driven, the cam ring is set in rotary movement, and at the same time the rollers 31 run on the cam contact surface 11. A to-and-fro movement of the pump pistons 37 is thereby generated, and these first of all suck up fuel via the longitudinal grooves 54 and the filling bores 55 during their outward movement along a rear cam flank, so that when the rollers 31 are located on the bottom of the cam contact surface the pump working space is completely filled with fuel. During the subsequent pump-piston feed stroke, in which the rollers are moved inwards over the rising front cam flank, the fuel in the working space is conveyed under high pressure to the injection valves via one of the pressure lines 62, as long as the relief channel 66 is not opened by means of the electrically controlled valves 67. However, when the relief channel opens, the pump working space is then relieved abruptly, so that fuel can no longer be fed under high pressure and the injection stroke is terminated.

The pump pistons are each arranged in the piston-carrier part 33 so that the forces arising during the feed stroke are compensated. That is to say, if only two pump pistons are used, these are diametrically opposite one another, and if there are several pump pistons these are distributed round the distributor at equal angular distances from one another. But because of this, the piston-carrier part is not subjected to any forces caused by the pump-piston drive, so that it can move unimpeded and floating freely on the periphery of the distributor. In particular, in this way the piston-carrier part 33 is prevented from jamming. This too is now an essentially stationary part of the pump piston drive, just like the roller-carrier part 13, to which it is coupled via the coupling arm 39 so as to compensate alignment errors.

In the above-described mode of operation of the fuel injection pump, the solonoid valve 67 is closed at the start of the feed stroke of the pump pistons and is opened only in order to determine the injection-effective feed stroke. This mode of operation makes it possible, in the first place, to change the feed start in relation to the drive speed of the drive shaft 8. But the advantage of this arrangement is, above all, that the height of the cams or the length of the cam flanks can be utilized in the most effective possible way for calculating the fuel injection rate, so that a relatively high pump-piston feed rate per revolution of the drive shaft 8 can be achieved. With an increasing number of cylinders of the internal-combustion engine which are to be fed, the available cam length or cam amplitude decreases. It must also be remembered that the cams are not made arbitrarily steep because of applied pressures and the dynamic behaviour of the cam contact with the roller 31. At the same time, in particular, the rotational speed of a roller, by means of which the fuel injection pump is driven, also plays a part. At low rotational speeds, the cams can be made steeper. However, on modern diesel internal-combustion engines, both very high fuel injection pressures and high rotational speeds, in conjunction with the high number of cylinders of the internal-combustion engine, are demanded. Consequently, the above-described mode of operation of the fuel injection pump is highly advantageous, the adjustment of the injection start being carried out in another way. Injection is started by rotating the piston-carrier part together with the roller-carrier part which is moved via the actuating arm 22. This actuating arm is actuated by means of an injection adjuster of known design. Thus, the advantage of the arrangement provided is that the forces exerted on the rollers via the cams in the fuel injection pump while it is being driven are primarily absorbed by the roller-carrier part which is guided over a large area on the cylindrical guide part 18, where the loads can be diverted. The inner piston guide part which has to be guided on the distributor with an exact fit, in order to seal off the pump working space 53 is no longer exposed to these forces, but follows free of any forces, with alignment errors being compensated at the same time. The inner bore 34 of the piston-carrier part can therefore be made exact, without extra loads causing jamming between the distributor and piston-carrier 33 with the close fit provided.

FIG. 5 shows diagrammatically the hydraulic diagram of the fuel injection pump, and it also illustrates the injection-adjuster servo-motor 16, with an alternative design for this in FIG. 6. As described, the feed pump 47 generates, in the interior 6 of the pump, a pressure which changes as a function of the rotational speed. In the exemplary embodiment according to FIG. 6, this pressure passes, via a throttle bore 74 in the regulating piston 27 of the injection adjuster 16, into a working space 75 which is enclosed by the regulating piston 77 in a closed cylinder 76. The regulating piston 77 is loaded on the other side. The regulating piston is shifted to a greater or lesser extent towards this side according to the pressure prevailing in the working space 75 and thereby adjusts the actuating arm 22 in the known way. The control pressure in the work space 75 can now change as a direct function of the fuel pressure in the pump inner space 6, that is to say as a function of the rotational speed. With an increasing speed, the roller-carrier part 13 is rotated, so that the rollers 31 are moved inwards at a relatively early moment in the rotation of the drive shaft, and the start of fuel injection is thus advanced. However, the control pressure can also be changed as a function of other parameters or can be influenced in addition to the dependence on speed. This is carried out advantageously by means of a solonoid valve 78 located in a relief line 79 which leads off from the injection-adjuster working space 75. This valve can be actuated in an analogous manner, but preferably in a timed manner, the timing ratio or the degree of opening being controlled as a function of operating parameters via an electronic control not illustrated further here. At the same time, in particular, the hot-running of the internal-combustion engine can also be taken into account. However, it has also already been proposed to cause a variation in the start of injection in order to influence the dynamic behaviour, for example in the event of rapid load absorption. Such measures can also be carried out in a simple way here.

FIG. 5 shows a servo-injection adjuster likewise corresponding to a known design and having a servo slide 80, the adjusting movement of which is followed by the regulating piston 27'. When the slide 80 is defected as a result of a change of pressure in the pump inner space 6, it either makes a connection between the pump inner space 6 and the working space 75 or makes a connection between the working space 75 and a relief space 81. These connections continue until, as a result of the change of pressure in the working space 75, the regulating piston 27' is shifted counter to its restoring spring 73 until the connecting orifice opened by the slide 8 is closed again. Whereas, with the exemplary embodiment according to FIG. 5, only a controlled adjustment of the roller-carrier part 13 is possible, with the alternative embodiment according to FIG. 6 an exact control of the piston-carrier part 13 is carried out by trans-mitting a feed back signal representing the start of injection to the electronic control part 83 controlling the solonoid valve 78 and by regulating the actual start of injection as a result of this feed back signal in comparison with the predetermined desired value. As can be seen in FIG. 5 and also FIG. 2, for feed back there is a pressure transducer 84 which is connected, for example, to the annular space 65 via a branch bore 85. The pressure generated in the pump working space can be determined exactly at this point as a pressure rise, and by means of this pressure flank a control signal for appropriate processing by the control unit 83 can be generated. The pressure can, of course, also be measured at other points, but this point is advantageous where this particular construction is concerned. There is then a follow-up of the regulated injection start by the injection end, namely the moment of opening of the electrically controlled valve 67, taking into account the particular injection rate.

In an alternative to the above-described operating principle, the moment of injection is preset approximately as a result of the rotation of the roller-carrier part 13, that is to say, for example, as a function of the rotational speed, and fine control of the injection start is obtained by also controlling the closing moment of the electrically controlled valve 67. In this way, after an initial feed stroke of the pump piston, during its movement out of the cam bottom, the relief channel 66 can be opened first and then closed by means of the solenoid valve 67 only at a moment determined by the desired-value/actual-value comparison in the control unit 83. From this moment, the feed of the pump pistons then takes place under high pressure, until the injection time is ended by reopening the relief channel. The advantage of this is that, as a result of the regulation, there are no large control strokes to be executed, since the approximate adjustment is already carried out mechanically.

Of course, in a further possible alternative form of the rate control and injection timing control, as indicated in German Patent Application P 35 23 536, when the rotary position of the roller-carrier part or piston-carrier part is unchanged the injection start is controlled as a result of the closure of the solenoid valve and the injection time is controlled by the moment at which the solenoid valve is reopened.

FIG. 2 illustrates an alternative embodiment to the constructive design shown in FIG. 1, and in this the collar 44 designed as a ring fastened to the distributor end, in the exemplary embodiment according to FIG. 1, is replaced by a formed-on collar. Furthermore, in the exemplary embodiment according to FIG. 2, there is an improved fastening of the actuating arm 22 to the roller-carrier part 13. Here, the actuating arm 22' has, at its end pointing to the cylindrical guide part 18, a flattened portion 87 produced, for example, as a result of partial milling. The flattened portion extends over some of the length of the radial passage bore 23 in the roller-carrier part 13' and, by means of its end 88, serves as a depth stop, against which a bolt 89 guided transversely through the roller-carrier part 13' comes to rest. The roller-carrier part 13' is also equipped, in the region of the bolt 89, with a slot 90 extending into the radial bore 23, so that the actuating arm 22 can be clamped in the radial bore 23 by means of the bolt designed as a screw bolt. However, axial retention of the actuating arm 22 can also be guaranteed by the depth of penetration of the pin 21 into the annular groove 20. This design guarantees a reliable and rigid connection between the injection-adjuster servo-motor 16 and the roller-carrier part 13', and the actuating arm 22 can be made with a large diameter and is simple to produce.

Figure 3:
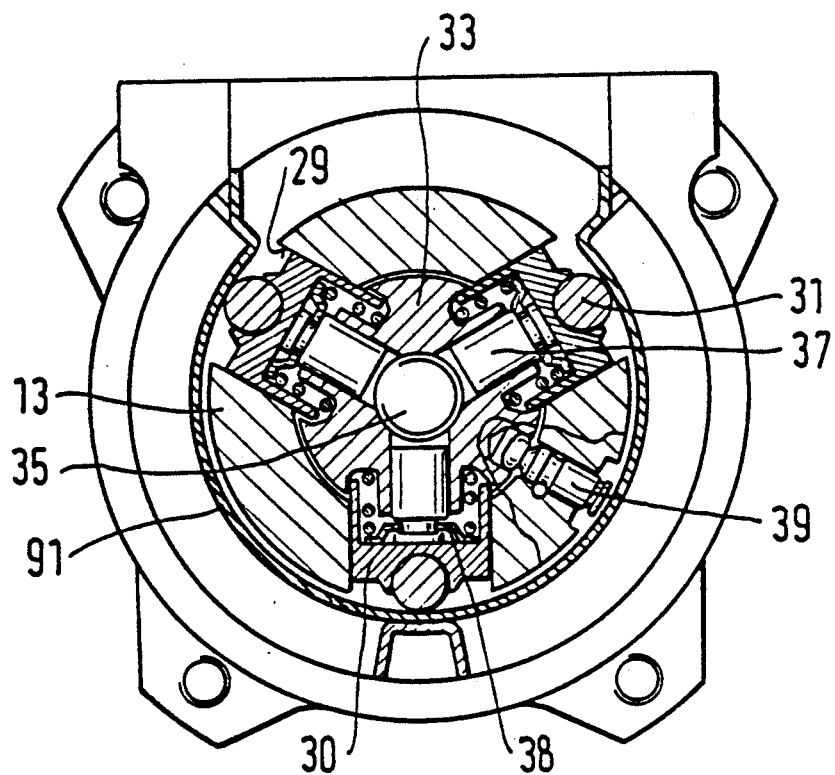
FIG. 3 shows a third exemplary embodiment with an assembly ring shown in conjunction with FIG. 2.

FIG. 2 also shows a ring 91 which is inserted into the cylindrical part 3 and which is located between the open end of the cylindrical part and the cam ring 9. The diameter of the ring is less than or at most equal to the diameter of the cam bottom, and its function is to make it easier to assemble the fuel injection pump. During assembly, gaskets, the feed pump 57 and the drive shaft 8, together with the cam ring 9, are first installed in the pot-shaped part. Together with the cover part 2, the roller-carrier part 13 and the piston-carrier part 33 are preassembled and, for introduction into the cylindrical part 3 of the casing of the fuel injection pump, the rollers are pressed together counter to the restoring forces of the springs 32, in such a way that the rollers, together with the cover part 2, can be introduced into the ring 91. Thereafter, it is merely necessary to push the preassembled composite structure in further, until the rollers enter the radial region of the cam contact surface 11. To achieve this, it was previously necessary to align the rollers with the cam bottoms of the cam contact surface 11. After this assembly operation, the distributor can subsequently be inserted, as already described with reference to FIG. 1, the distributor cylinder 42 closed and the solonoid valve 67 attached. Thus, the casing of the fuel injection pump need only be made in two parts, the assembly ring 91 bridging the gap between the open end of the cylindrical part of the injection-pump casing and the cam ring 9. The ring can be cast in or, according to FIG. 3, inserted as a clamping ring. FIG. 3 shows the pump in a section taken in the plane of the pistons, on the one hand, and in the offset plane of the ring 91, on the other hand.

Figure 4:
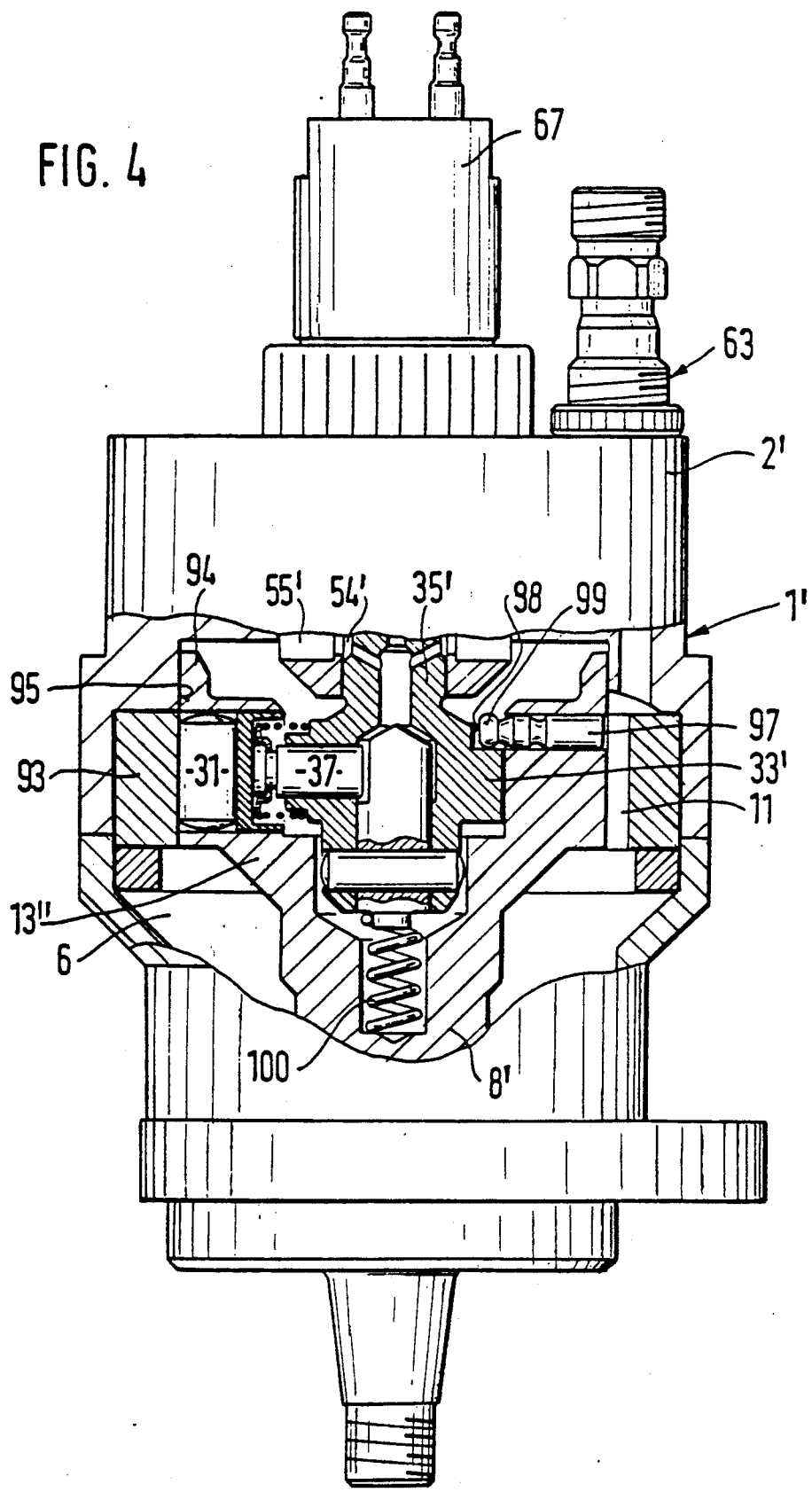
FIG. 4 shows a fourth exemplary embodiment in a distributor pump which, in contrast to the abovementioned exemplary embodiments, has an essentially stationary cam ring.

FIG. 4 illustrates an alternative embodiment to the exemplary embodiment according to FIG. 1, and it shows the distributor pump of the radial-piston pump type which, as a cam drive, has an essentially stationary cam ring 93 which, once again, is adjustable by means of an injection adjuster as regards its relative position in relation to a fixed point which recurs at the frequency of the drive speed of the drive shaft. Here, the roller carrier 13 provided in the exemplary embodiment according to FIG. 1, is connected integrally to the drive shaft 8' which likewise widens in the manner of a pot towards the pump inner space 6 and which forms with this pot-like part the roller-carrier part 13''. This is guided, by means of a part 94 of its outer peripheral surface, on the cylindrical inner surface 95 of the casing 1' in a similar way to the rotary-driven part in the exemplary embodiment according to FIG. 1. As a modification of the exemplary embodiment according to FIG. 1, the piston-carrier part 33' is the end of the distributor 35' projecting into the pump inner space 6, the filling grooves 54' of the distributor 35' on the one hand now interacting with filling orifices 55' which are arranged in the cover part 2' and which are connected to the pump inner space 6. This coupling of the distributor 35' on the one hand to the drive shaft 8' and of the piston-carrier part 33' to the roller-carrier part 13'' is now made by means of an engaging pin 97 which is inserted radially into the roller-carrier part 13'' and which engages by means of a spherical head into a recess 98 in the periphery of the piston-carrier part 33. At the same time, the connection can be made in a similar way to the connection between the drive shaft 8 and distriubtor in the exemplary embodiment according to FIG. 1. In this case, too a compression spring 100 supported on the drive shaft 8' subjects the distributor to axial load and ensures the contact of the head 9 in the recess 98 open towards the cover part 2. With this arrangement too, alignment errors can be compensated in a simple way, so that the tight fit of the distributor 35' in the distributor cylinder does not cause functioning to be impeded as a result of transverse loads. The stable roller-carrier part assigned to the drive shaft 8' absorbs the high forces, and in addition it is also guided radially, in order to compensate any tilting moments from the drive side of the drive shaft 8', the distributor thus following simply free of transverse forces.

Figure 7:
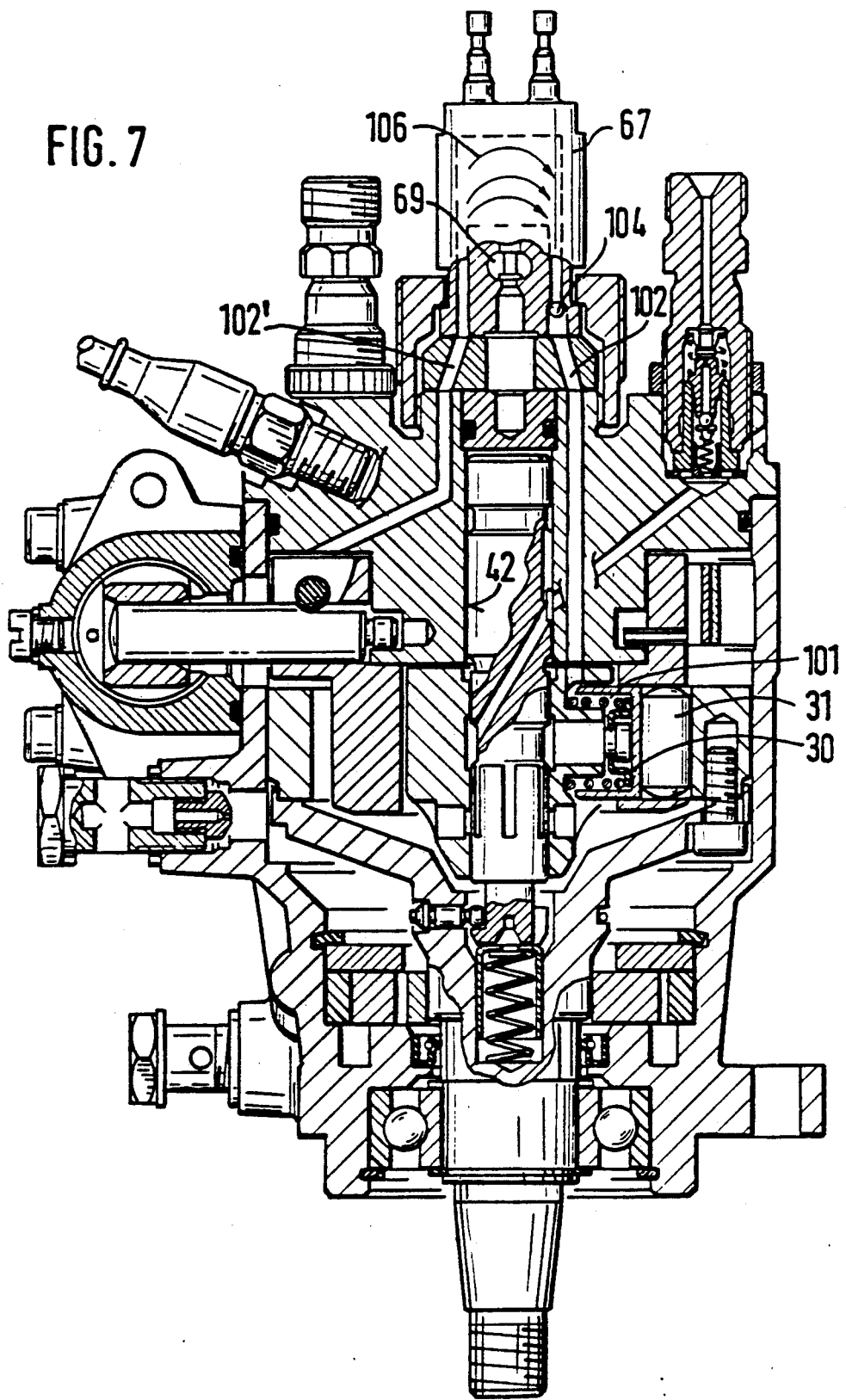
FIG. 7 is a representation of an oil circuit of the electrically actuated valve as a seventh exemplary embodiment of the invention.

An additional embodiment can be taken from FIG. 7 which relates to forced cooling of the solenoid valve 67. Here, the volume enclosed by the cup-shaped roller tappet in the radial bore 29 on the same side as the restoring springs 32 is used as a pump working space 101 which communicates with the inner space of the solenoid valve 67 via a suction line 102 leading, parallel to the distributor cylinder 42, to the outer end face of the cover part 2. The suction line 102 opening out on the end face goes over into the housing 103 of the solenoid valve 67, where there is a non-return valve 104 opening towards the pump working space 102. The line then leads further to an inner space 106 of the solenoid valve which is closed off from the valve space 72 and which contains the solonoid-valve magnet winding not shown in detail here. The inner space 106 is also connected to the pump inner space 6 via the suction line 104' leading further. During an outward stroke of the rollers 31 or of the cup-shaped roller tappets 30, fuel is sucked up from the pump inner space 6 via the suction line 102, the non-return valve 104, the inner space 106 of the solenoid valve and the suction line 102' leading further, with the result that the inner space of the solenoid valve 67 is flushed and at the same time cooled. During the subsequent feed stroke of the pump pistons in the course of the inward movement of the roller tappets 30, the non-return valve 104 is closed and the pump working space 101 is relieved either via a further non-return valve or via a throttle orifice. These alternative embodiments are not shown in the drawing. The advantage of this design is that there is no need to provide an additional cooling pump for the solenoid valve. The functioning of the solenoid valve is not affected by the flushing, since flushing takes place in the suction phases of each of the pump pistons, during which the solenoid valve is not switched. Furthermore, flushing and cooling are carried out as a function of the drive speed of the fuel injection pump or as a function of the number of actuations of the solenoid valve and consequently as a function of the heat arising there.

The advantageous pump design illustrated here provides a fuel injection pump of highly compact construction, which is also capable of accepting high injection pressures and high rotational speeds and which, at the same time, can also feed a large number of cylinders of an internal-combustion engine. Another advantage of the pump is that it can control the fuel injection rate and also the injection start very accurately by the use of an electronic control and at a low outlay.

We claim:

1. A fuel injection pump for internal combustion engines with injection points, comprising:
   means for forming a pump working space (53);
   at least two pump pistons (37) reciprocably moving in said pump working space (53) so as to have an injection-effective pump piston pressure stroke and a suction stroke;
   a distributor (35) having a periphery and a distributor orifice (61) arranged on said periphery in constant connection with said pump working space (53), said distributor being formed to drive synchronously with said pump pistons (37);
   a plurality of pressure channels (62) connectable via injection lines (63) to injection points (64) of the internal combustion engine, said working space (53) being connected to a respective one of said pressure channels (62) during said pressure stroke;
   means for providing fuel and including a fuel storage (58) and a filling line (54, 55) communicating with said fuel storage (58), said distributor (35) being connected to said fuel storage via said filling line (54, 55) during said suction stroke;
   means for relieving pressure from said working space (53) and including a relief channel (66);
   means for communicating said distributor (35) with said relief channel (66) during said pressure stroke and including an electrically controlled valve (67) therebetween;

means for controlling said injection-effective pump piston pressure stroke and including cam drive means formed to reciprocably move said pistons (37), said cam drive means including at least an essentially stationary part (13, 33, 93) and a rotary-driven part (9, 13", 33'), one of said parts having a cam contact surface (11) with cams lying in a radial plane relative to an axis of said rotary part and the other part having a piston carrier (33, 33') and a roller carrier (13, 13") with radial guide bores (29);

means for guiding said pump pistons (37) and including radial guide bores (36) formed in said piston carrier (33, 33') through which said pump pistons (37) interact with said cam surface (11), said cam drive means having rollers (31) guided in said radial guide bores (29) of said roller carrier and interposed between said parts, said pistons (37) being formed to move in response to said rollers (31) running on said cam contact surface (11) in response to a relative movement of said parts;

a coupling (46, 47, 49);

means for guiding said distributor (35) coaxially relative to said rotary driven part and including a distributor cylinder (42), said distributor (35) being formed as a shaft and being coupled via said coupling (46, 47, 49) to said rotary-driven part (8); and means for compensating for misalignments and including a coupling part (39, 97) coupling said piston carrier (33, 33') to said roller-carrier (13, 13"), said coupling part (39, 97) being connected rigidly to one of said carriers (13, 13" or 33, 33') and having a spherical shape in contact to the other of said carriers (13, 13" or 33, 33') so that misalignments are compensated in radial and axial directions due to said spherical shape being in said contact.

2. A fuel injection pump for internal combustion engines, comprising:

means for forming a pump working space (53);

at least two pistons (37) reciprocably moving in said pump working space (53) and having an injection-effective pump piston pressure stroke and a suction stroke;

cam drive means for reciprocably moving the pistons (37) and including two parts, the two parts including an essentially stationary part (13, 33, 93) and a rotary-driven part (8, 9, 13", 33') with an axis, said rotary-driven part being formed to rotate about said axis and to move relative to said essentially stationary part, one of the two parts having a cam contact surface (11) with cams directly radially with respect to the axis of the rotary-driven part, the other of the two parts having two carriers including a piston carrier (33, 33') with radial bores (36) and a roller-carrier (13, 13") with radial bores (29), the pistons (37) being guided in the radial bores (36) of the piston carrier (33, 33');

means for interacting the pistons (37) with the cam contact surface (11) and including rollers (31) interposed between the two parts of the cam drive means and being formed to run on the cam contact surface (11) in response to a relative movement of the two parts of the cam drive means, the pistons (37) being formed to move in response to the rollers (31) running on the cam contact surface (11); and means for compensating for misalignments in radial and axial directions and including a coupling (39, 97) having a spherical shape in contact with one of the two carriers (13, 13"; 33, 33') of the cam drive means, the coupling (39, 97) being rigidly connected to the other of the two carriers of the cam drive means.

3. Fuel injection pump according to claim 2, wherein the coupling part is a coupling arm projecting into a recess (41, 88) radially relative to the axis of the rotary-driven part (8, 8') of the cam drive.

4. Fuel injection pump according to claim 2, wherein the cam contact surface (118) is arranged on the essentially stationary part (93), and the distributor is formed on a piece projecting from the distributor cylinder (42) and functioning as a piston carrier (33') and is coupled, via the coupling part (97), to the rotary-driven part of the cam drive means designed as a roller-carrier (13") (FIG. 3).

5. Fuel injection pump according to claim 2, wherein the distributor (35) has an end facing the rotary-driven part (8) and a collar-like part (44) with an outer surface and a side facing away from the rotary-driven part (8), the outer surface being formed with a continuous longitudinal groove (45) with a groove bottom and a non-continuous recess (49) with a recess bottom, the recess opening out on the side of the collar-like part, the continuous longitudinal groove having at least a width equal to that of the non-continuous longitudinal groove and at most a radial distance between the groove bottom and an axis of the distributor (35) equal to a radial distance between the recess bottom and the axis of the distributor (35); and further comprising:

means for bringing the distributor (35) to rest in an installed state and including a compression spring (48) clamped between the end of the distributor (35) and the rotary-driven part (8), and a radial coupling arm (46) projecting into an end of the non-continuous recess (49) and connected to the rotary-driven part (8), the compression spring (48) being formed to bring the distributor (35) to rest against the radial coupling arm (46).

6. Fuel injection pump according to claim 5, wherein the end of the coupling arm (46) projecting into the groove is of spherical shape.

7. Fuel injection pump according to claim 5 wherein the diameter of the collar-like part (44) is less than and at most equal to the diameter of the distributor cylinder (42) (FIG. 2).

8. Fuel injection pump according to claim 5 wherein the collar-like part (44) is designed as a ring fastened to the end of the distributor (35) (FIG. 1).

9. Fuel injection pump as defined in claim 2, further comprising:

means for distributing fuel and including a distributor (35) having a periphery and being driven synchronously with the pistons (37) and the cam drive means, and a distributor cylinder (42) guiding the distributor (35), said distributor (35) having a distributor orifice (61) on the periphery of the distributor (35) that is connected constantly to the pump working space (53).

10. Fuel injection pump according to claim 9, wherein the distributor is formed as a shaft, the distributor being guided by the distributor cylinder (42) coaxially relative to the rotary-driven part (8) and being coupled to the rotary-driven part (8).

11. Fuel injection pump according to claim 9; and further comprising:

a pump casing enclosing a suction space (6) therein; and filling orifices (55), the periphery of the distributor being formed with filling grooves (54) thereon which are connected to the filling orifices (55) during the suction stroke of the pump pistons (37) and which connect the pump working space (53) to the suction space (6) enclosed in the pump casing.

12. Fuel injection pump according to claim 11, characterized in that the filling grooves are arranged in the region of the non-rotary-driven piston-carrier part, and the filling orifices are provided in the piston-carrier part (33) arranged in the pump inner space (36).

13. Fuel injection pump according to claim 11, characterized in that the filling grooves (54') are located in the region of the distributor cylinder (42) in which the filling orifices (55') open out.

14. Fuel injection pump as defined in claim 9; and further comprising:
 a plurality of pressure channels (62) extending from said distributor cylinder (42) and being formed to connect to injection points (64) of an internal combustion engine via injection lines (63) of the internal combustion engine, the working space (53) being connected to a respective one of the pressure channels (62) during the suction stroke.

15. Fuel injection pump according to claim 14, wherein the cam contact surface (11) is arranged on the rotary-driven part of the cam drive means (8, 9), and the piston-carrier part (33) is mounted rotatably as an annular element on the distributor (35) and is coupled to and surrounded by the roller-carrier (13).

16. Fuel injection pump according to claim 15, wherein the rotary-driven part (8, 8') is guided on an outer periphery in a casing of the fuel injection pump.

17. Fuel injection pump according to claim 15; and further comprising:
 means for changing a relative position of at least the essentially stationary part of the cam drive means relative to a specific point recurring at a frequency of rotation of the rotary-driven part of the cam drive means.

18. Fuel injection pump according to claim 15, and further comprising:
 a pump casing in which the roller-carrier (13) is guided radially.

19. Fuel injection pump according to claim 18, wherein the pump casing consists of a pot-shaped part (1) and a cover part (2) which closes the former so that a pump inner space (6) is defined therebetween, the distributor cylinder (42) and the pressure channels (62) being arranged in the cover part (2), the distributor cylinder (42) having an axis, the cover part (2) having a cylindrical guide part (18) which is coaxial relative to the axis of the distributor cylinder (42) and projects into the pump inner space (6), the cylindrical guide part (18) being formed with a periphery on which guides the roller-carrier radially via a second step-bore part (15) of a step bore extending continuously in an axial direction to the roller-carrier (13).

20. Fuel injection pump according to claim 19, and further comprising:
 means for actuating the roller-carrier and including an actuating arm (22) releasably and rigidly connected to the roller-carrier (13), the actuating arm (22) having an outer end and an inner end, a servo motor (16) operatively connected to the outer end, and an annular recess (20) in which projects said inner end and against which rests said actuating arm in an axial direction.

21. Fuel injection pump according to claim 20 and further comprising:
 a clamping screw (89), the roller-carrier (13) having a radial passage bore (23) in which the actuating arm (22) is mounted on the roller-carrier (13), the inner end of the actuating arm (22) having a flattened portion (87) with an outward-pointing end (88) serving as an adjusting-depth stop for the actuating arm against the clamping screw (89), the clamping screw (89) screwing in transversely relative to and intersecting the radial passage bore, the radial passage bore (23) having a length, the roller-carrier (13) having an end face located on a same side as the clamping screw and having a slot over at least some of the length of the radial passage bore (23) from the end face located on the same side as the clamping screw.

22. Fuel injection pump according to claim 20, wherein the actuating arm (22) is made crowned at the end projecting into the annular recess (20).

23. Fuel injection pump according to claim 19, wherein the pot-shaped casing part (1) has a ring (91) which is arranged towards an open side axially next to the part carrying the cam contact surface and the diameter of which is at most/equal to the diameter, on which the cam bottom of the cam contact surface (11) rests.

24. Fuel injection pump according to claim 23, wherein the ring is designed as a ring inserted in the pot-shaped casing part.

25. Fuel injection pump according to claim 24, wherein the ring consists of plastic.

26. Fuel injection pump as defined in claim 14, and further comprising:
 means for supplying fuel and including fuel storage (58) and a filling line (54, 55), the filling line (54, 55) being in communication with the fuel storage (58), the distributor (35) being in communication with the fuel storage (58) via the filling line (54, 55) during the suction stroke.

27. Fuel injection pump as defined in claim 26; and further comprising:
 means for relieving pressure in the pump working space and including an electrically controlled valve (67) opening and closing in response to a predetermined pressure in the pump working space (57), the means for relieving pressure also including a relief channel (66) in communication with the distributor (35) via the electrically controlled valve (67) when the electrically controlled valve (67) is open.

28. Fuel injection pump according to claim 27 wherein the distributor (35) and the distributor cylinder (42) are formed to define an annular space (65) therebetween which is in permanent communication with the working space (53); and further comprising:
 a casing in which extends a relief channel (66) from the annular space (65) the relief channel (66) leading to the electrically controlled valve (67).

29. Fuel injection pump according to claim 28, wherein the casing has an end face on which is arranged the electrically controlled valve (67), the pressure channels (52) leading off all around the distributor cylinder (42), the electrically controlled valve (67) also being arranged centrally between the pressure channels (52).

30. Fuel injection pump according to claim 29, wherein the electrically controlled valve is formed as a solenoid valve having a closing member controlled by magnetic forces that is formed as a pressure-compensated needle-valve closing member (70) with an axis parallel to the axis of the distributor (35), the pressure-compensated needle-valve closing member (70) having a sealing face (72) turned towards the distributor, the sealing face (72) having a front shaped conically, the solenoid valve having a valve seat (73) on the same side as the closing member, the front of the closing member being formed to interact with the valve seat (73) to limit a portion of the relief channel (66) located on a high pressure side and connected directly to the pump working space (53).

31. Fuel injection pump according to claim 30, wherein a transverse bore (85), in which a pressure transducer (84) is arranged, branches off from the annular space (65).

32. Fuel injection pump according to claim 30, wherein the axis of the pressure-compensated needle-valve closing member (70) is coaxial to the axis of the distributor (35).

33. Fuel injection pump according to claim 27, wherein the electrically controlled valve (67) is formed as a solenoid valve with an inner space (106) closed relative to a high-pressure side, the solenoid valve having a magnetic winding arranged in the inner space, the roller-carrier (13. 13') having roller tappets (30) that are cup-shaped and mount the rollers (31) thereon, the roller tappets (30) being fitted tightly in the radial guide bores (36) of the roller-carrier (13, 13') so as to enclose a second pump working space (101) on a side facing away from the rollers (31); and further comprising:
   means forming a second channel (102) between the second working space (101) and the fuel storage (58); and
   second means for relieving pressure in the second pump working space and including a non-return valve (104) arranged in said suction channel (102), the non-return valve (104) being formed to open in a feeding direction so as to communicate the pump working space (101) with the fuel storage (58), the valve inner space (106) being located in one of the channels.

34. Fuel injection pump according to claim 33, wherein the non-return valve (104) is arranged in the suction line (102) between the solonoid valve (67) and the roller tappet (30).

35. Fuel injection pump according to claim 34, wherein a relief channel is connected permanently to the fuel store via a throttle or a non-return valve.

36. Fuel injection pump according to claim 34, wherein the second means for relieving pressure from the second pump working space (101) includes a second relief channel in communication with the second pump working space (101) and means for alternatively opening and closing the second relief channel and including an element moving synchronously with the rotary-driven part.

37. Fuel injection pump according to claim 36, wherein the electrically controlled valve (67) is closed at the start of the pumping stroke of the pump pistons (37), in order to control the injection-effective pump-piston feed stroke, and is opened in order to end the injection-effective pump feed stroke, and to adjust the start of high-pressure fuel injection the relative position of the at least essentially stationary part of the cam drive in relation to a point recurring at the frequency of rotation on the rotary-driven part of the cam drive can be changed.

38. Fuel injection pump according to claim 37, wherein the adjustment of the relative position is detected by means of a feed back member (84) and regulated according to predetermined desired values and is taken into account in the control of the moment of opening of the electrically controlled valve (67).

39. Fuel injection pump according to claim 37, characterized in that pilot control means for adjusting the relative position as a function of operating parameters, after the start of the feed stroke the injection start is regulated as a result of the control of the moment of closing of the electrically controlled valve (67), and the end of the injection time and consequently of the injection quantity is controlled or regulated by means of the moment of reopening of the electrically controlled valve.

40. Fuel injection pump according to claim 37, further comprising:
   means for adjusting the relative position and including a servo-motor (16) adjusting the relative position as a function of at least one operating parameter.

41. Fuel injection pump according to claim 40, wherein the servo-motor (16) adjusts the relative position as a function of a speed of the internal-combustion engine.

42. Fuel injection pump according to claim 40, wherein the servo-motor has a regulating piston(27) subjected to a control pressure counter to a spring force.

43. Fuel injection pump according to claim 42, wherein the control pressure can be varied as a result of an inflow and an out-flow, controlled by an electrical valve (78), of the working space (75) which is limited by the regulating piston (27) and which is supplied with fuel under pressure from a pressure source.

44. Fuel injection pump according to claim 43, wherein the electrically controlled valve (78) is actuated in a timed manner with a variable timing ratio.

* * * * *